US006862886B2

(12) United States Patent
Stewart (10) Patent No.: US 6,862,886 B2
(45) Date of Patent: Mar. 8, 2005

(54) METHOD OF COMBINING WASTEWATER TREATMENT AND POWER GENERATION TECHNOLOGIES

(76) Inventor: Leonard L. Stewart, 4358 Chico Ave., Santa Rosa, CA (US) 95407

( * ) Notice: Subject to any disclaimer, the term of this patent is extended or adjusted under 35 U.S.C. 154(b) by 0 days.

(21) Appl. No.: 10/200,993

(22) Filed: Jul. 22, 2002

(65) Prior Publication Data

US 2003/0046931 A1 Mar. 13, 2003

Related U.S. Application Data

(63) Continuation of application No. 09/836,967, filed on Apr. 17, 2001, now abandoned, which is a continuation-in-part of application No. 08/969,712, filed on Nov. 14, 1997, now Pat. No. 6,216,463, which is a continuation of application No. 08/545,110, filed on Oct. 11, 1995, now abandoned.

(51) Int. Cl.[7] ............................................... F03G 7/00
(52) U.S. Cl. ..................................... 60/641.2; 60/641.1
(58) Field of Search ............................. 60/641.1, 641.2; 210/710, 747

(56) References Cited

U.S. PATENT DOCUMENTS

| | | | | |
|---|---|---|---|---|
| 2,962,599 A | * | 11/1960 | Pirkey | |
| 3,962,943 A | * | 6/1976 | Allen | 83/370 |
| 4,052,858 A | * | 10/1977 | Jeppson | 60/648 |
| 4,091,623 A | * | 5/1978 | Edmondson et al. | 60/641 |
| 4,542,625 A | * | 9/1985 | Bronicki | 60/641.2 |
| 4,665,281 A | * | 5/1987 | Kamis | 174/102 R |
| 4,842,248 A | * | 6/1989 | Shy | 254/29 R |
| 5,400,598 A | * | 3/1995 | Moritz et al. | 60/641.2 |
| 5,439,363 A | * | 8/1995 | Owens et al. | 425/3 |
| 5,484,231 A | * | 1/1996 | Cannan et al. | 405/128 |
| 5,538,598 A | * | 7/1996 | Schlesinger et al. | 202/206 |
| 5,925,223 A | * | 7/1999 | Simpson et al. | 203/11 |
| 6,216,463 B1 | * | 4/2001 | Stewart | 60/641.2 |

* cited by examiner

Primary Examiner—Hoang Nguyen
(74) Attorney, Agent, or Firm—Russo & Hale LLP; William C. Milks, III (57) ABSTRACT

Applicant's preferred embodiment utilizes municipal wastewater effluent to replenish a depleted geothermal field. Condensate produced by expanding steam produced in the geothermal field through a steam turbine-generator may be pooled with cooked water collected from said field, and then directed through a penstock from a higher elevation to a lower elevation where further energy is extracted through a traditional hydroelectric turbine-generator. The cooked water and condensate may be treated to produce potable water and/or distributed for public consumption either before or after being directed to the hydroelectric turbine-generator. The effluent is pumped up to the geothermal field during off-peak periods of electric consumption, and the hydroelectric generation is accomplished during periods of peak electric demand. A fraction of the effluent may be used as cooling water for the steam turbine-generator and its associated condenser before injection into the geothermal field. At least a portion of the pipeline to transport the wastewater effluent is preferably routed along an undisturbed riverbed and/or through an excavated tunnel.

11 Claims, 10 Drawing Sheets

INCLINED UTILI-TUNNEL WITH PIPE BREACH FLOW-CHECK

LONGITUDINAL TUNNEL PROFILE

FIG. 11

INCLINED UTILI-TUNNEL™ WITH PIPE BREACH FLOW-CHECK

FIG. 12

TUNNEL BEGINNING PROFILE

METHOD OF COMBINING WASTEWATER TREATMENT AND POWER GENERATION TECHNOLOGIES

CROSS-REFERENCES TO RELATED APPLICATIONS

This is a continuation of application Ser. No. 09/836,967 filed Apr. 17, 2001, now abandoned, which application is a continuation-in-part of U.S. patent application Ser. No. 08/969,712, filed on Nov. 14, 1997, now U.S. Pat. No. 6,216,463, entitled "A METHOD OF COMBINING WASTE WATER TREATMENT AND POWER GENERATION TECHNOLOGIES", which is a continuation of U.S. patent application Ser. No. 08/545,110, filed on Oct. 11, 1995 entitled "A METHOD OF COMBINING WASTE WATER TREATMENT AND POWER GENERATION TECHNOLOGIES", now abandoned.

FIELD OF THE INVENTION

Applicant's invention deals with the utilization of wastewater effluent to revitalize a depleted geothermal field, and the combining of two power generation technologies to provide overall system efficiency gains.

The two power generation technologies employed are geothermal power generation, where steam is obtained from thermal fields underneath the surface of the earth, and hydroelectric generation, where energy is extracted from movement of a volume of water due to gravitational force.

The wastewater treatment phase of Applicant's invention capitalizes on the injection of municipal waste effluent into the strata of the geothermal field which supplies steam for power generation. Similar injection methods utilizing brine solutions have been employed historically to assist in the yield of geothermal steam. Such injection has been necessary to lower the mineral content of the geothermal steam and fluids. Lower temperature brine is mixed with high temperature, high mineral brine to reduce mineral content and re-injected into the field.

In this case, waste effluent is injected into the strata to replenish lost water, not to lower mineral content. The water is recaptured as cooked water or geothermal steam that is utilized for power production and treated to yield potable water.

Applicant's invention additionally deals with the laying of pipe or other conduit for the conveyance or transport of matter such as waste effluent or electrical current in a manner and place not otherwise possible, or at significantly higher construction and/or maintenance costs, while providing a potentially more direct alignment or route.

BACKGROUND OF THE INVENTION

Basic power generation technologies are generally grouped according to the energy source used to produce electricity. Fossil fuels such as coal, gas and oil are used to produce steam which is expanded through a steam turbine which, in turn, drives a generator thereby producing electric power. Fuels can also be combusted as in a gas turbine, where the primary energy source is hot gas which again expands and drives a generator. Nuclear power also uses a steam turbine-generator to convert steam produced by a nuclear reactor into power. In the case of geothermal power generation, steam naturally produced by the earth is extracted and processed to an extent, for expansion again, in a steam turbine-generator, although at much lower temperatures and pressures than the aforementioned fossil fuels.

While the efficiencies associated with the geothermal steam are much lower than that of the traditional fossil fuels, the steam is essentially free, after the installed cost of the delivery infrastructure, compared to the cost of fossil fuel necessary to produce like amounts of steam. Solar power has also been used to boil water for steam as in Solar One, a plant near Dagget, Calif.

Technologies such as hydroelectric generation utilize the extraction of potential energy from water moved from higher elevations to lower elevations, using the rush of falling water through a "Francis" or "Kaplan" impulse turbine in order to turn a generator and produce electricity. There is no need to produce steam in such a system. The impinging force of the water acting on the water turbine provides the energy to be extracted.

While naturally occurring energy sources such as sunlight or water are "free", they can vary in supply. In dry years, less hydroelectric generation is available. On cloudy days, less solar power can be generated. Where wind turbines are concerned, at least a mean wind velocity of 10 mph is required to justify installation, because if there is no wind, power is not produced. Similarly, geothermal fields finally expend their available steam, rendering the massive distribution system and generating equipment installed above the field useless. Utility companies and power associations have traditionally attempted to manage such systems: placing hydroelectric systems proximate to predictable watersheds and by building reservoirs; installing arrays of wind turbines in established zones of plentiful and predictable wind currents; building solar plants in desert locations, etc.

Today, in an effort to increase generation thermal efficiencies, technologies are sometimes combined. The best and primary example of such a combination is steam and gas turbine technology. In such a system, a gas turbine is used to generate electricity, and concurrently, the exhaust gases, at nearly 950° F., are directed through a heat recovery boiler to produce steam which is then expanded through a traditional steam turbine-generator. This combination dramatically increases the overall thermal efficiency beyond that seen with either gas or steam technology separately.

The aforementioned combinations are typically not available in the naturally occurring energy resources.

Efforts to find other renewable energy sources to reduce dependence on fossil fuels have spawned alternate fuels including the burning of agricultural waste such as wood chips, almond shells and rice hulls to generate power. Used tires, municipal solid waste in the form of a screened mass or refuse-derived fuel have also provided fuel for power generation. In the case of municipal solid waste, the fuel has been exploited in large part to reduce the amount of waste sent to landfills. To say that the utilization of municipal wastes in the generation of electric power advances the common good would be an extreme understatement.

What is continually needed, then, are ways to extend or augment the availability of renewable or natural resources beyond traditional system efficiency improvements, in order to prolong available energy resources and reduce the dependency on fossil fuels. In conjunction, new methods of utilizing municipal waste and its byproducts are also necessary to ease the environmental impact of simple disposal, and to provide a cleaner environment.

In Sonoma County, Calif., the world's largest geothermal power generation project has been operating for decades. The geothermal field, called the Geysers, was developed by major oil companies, and the giant power generation utility Pacific Gas & Electric Company exploited the field for electric generation, installing several steam turbine-generators, and leasing the resource field from the original developers. Other smaller utility companies have also leased portions of the field for production of electric power. Up to twenty-one units were installed over the years.

In the past decade, the pressure and volume of geothermal energy available in the Geysers field has lessened continually. Pacific Gas & Electric has closed several of the existing units and has curtailed production of others. Plans to retire existing units have been accelerated, and staff has been reduced.

In the neighboring community of Santa Rosa, Sebastopol, Rohnert Park and Cotati, millions of gallons of effluent are produced in the local wastewater treatment plant.

Approximately 30 million gallons per day of effluent are produced in relatively close proximity to the Geysers.

The introduction of 30 million gallons per day of waste effluent would, over time, replenish the depleted steam resource of the Geysers. The infrastructure necessary to deliver this water to the Geysers will require a pipeline whose capital cost is not unlike that necessary to construct a penstock and/or dam for hydroelectric plants.

Also, environmentalists have warned that a conventional pipeline to a geothermal field could rupture and release wastewater into nearby creeks. Additionally, a pipeline rupture could result in a substantial volume of wastewater cascading down from a higher elevation, creating a safety hazard. In the case of the Geysers, the situation is exacerbated by seismic activity.

SUMMARY OF THE INVENTION

Applicant's invention comprises a novel combination which utilizes municipal wastewater in such a way to revitalize a depleted geothermal field while also taking advantage of available terrain to combine hydroelectric and geothermal power generation technologies in a way never before attempted.

Wastewater effluent provided by the local municipalities would be delivered to a geothermal field such as the Geysers via a pipeline. At least a portion of the pipeline is preferably routed along an undisturbed riverbed and/or through an excavated tunnel.

The effluent may be injected at various points in the geothermal field. Potential injection points include the existing wells which have been exhausted of their geothermal steam.

According to Applicant's process, once the geothermal steam has been expanded in the turbines for the production of electricity, the spent steam is condensed and then may be redirected to a holding pond for storage. The stored condensate is transported to lower elevations via a penstock where energy is extracted in the form of electricity by a hydroelectric turbine-generator.

The cost of pumping the water back up the mountain can be partially offset by the value of the power extracted in the same way as a typical "pump-storage" hydroelectric facility. In such a scheme, water is pumped uphill during off-peak periods when the value of power is low. The hydroelectric generation is accomplished during peak periods when the value of power is high, thereby providing a sound economic reason for pumping the water uphill in the first place.

The present invention also deals with the laying of pipe, along with other conduits, primarily for the conveyance of water such as wastewater in a manner and place not otherwise possible, or at significantly higher construction and/or operational/maintenance costs, while providing a potentially more direct or convenient route. In one embodiment, the present invention permits unabated conduit inspection and maintenance potential.

For example, the present invention provides a method of laying pipeline submerged on an undisturbed riverbed without requiring bed preparation technologies. One embodiment of the present invention provides for laying shielded or unshielded pipe/cable/conduit (PCC) for the conveyance of fluids, particulate matter or electrical current while resting submerged on an undisturbed riverbed, on the bottom of any body of water, across a swamp, a bog, areas of quick soil, or across any other area of unstable material and/or spanning potholes, cavities or trenches while fully or partially suspended, while requiring no bedding preparation. The PCC shielding is provided to protect the PCC from external damage from impacts, stresses, ground movements, bedding cavitations or erosions.

In another embodiment, the present invention provides a pipeline constructed within a utili-tunnel. The utili-tunnel is preferably provided with a pipe breach flow-check.

DETAILED DESCRIPTION OF THE PREFERRED EMBODIMENTS

Figure 1:
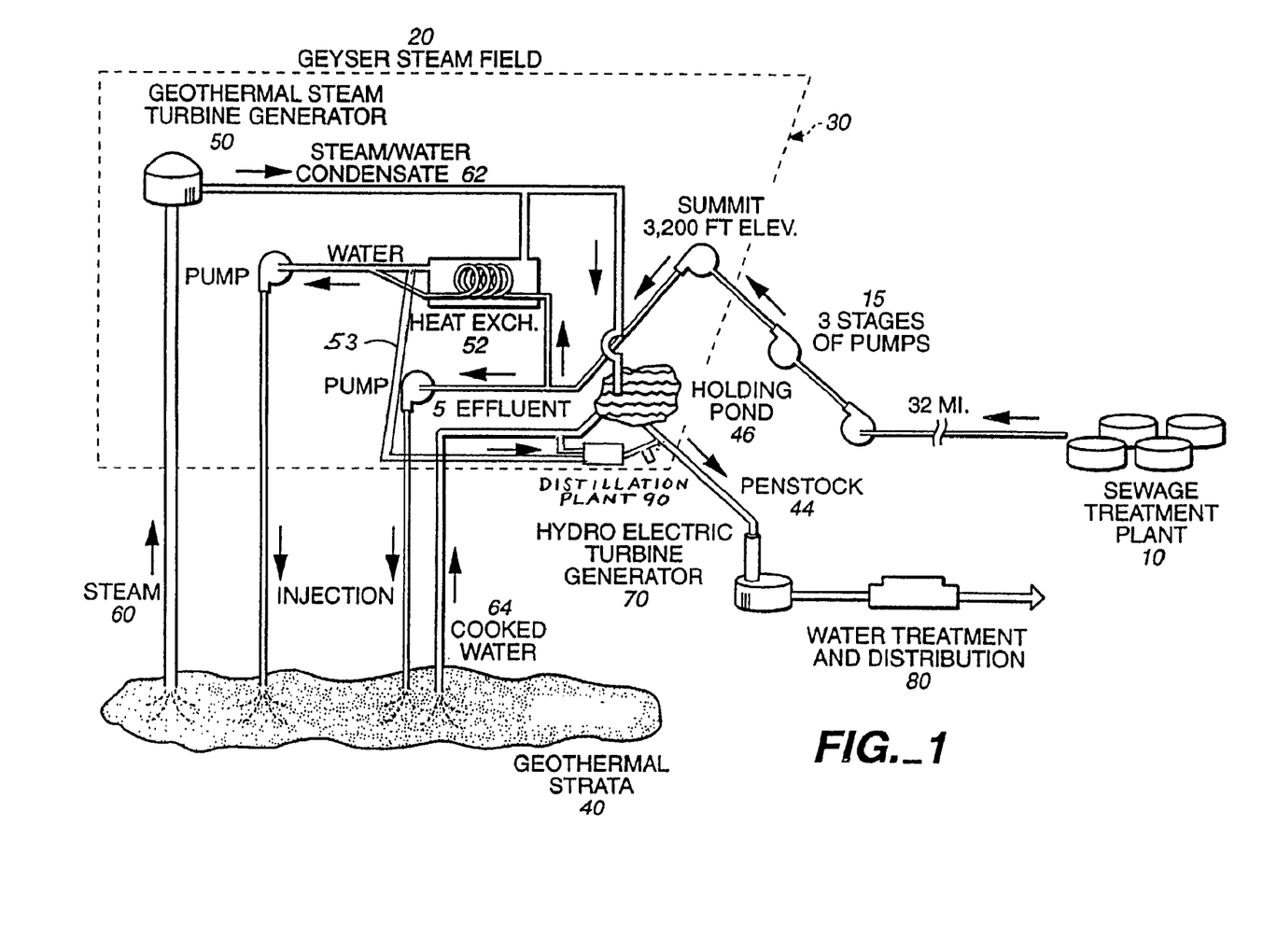
FIG. 1 is a line diagram of the steps of Applicant's method of employing wastewater effluent in power generation technologies.

A sewage treatment plant 10 provides effluent 5, for use in a geothermal steam field such as the Geysers steam field 20, located at site 30. Also located at site 30 are the following components, as shown in FIG. 1: a steam turbine-generator 50, a heat exchanger system 52, a holding pond 46, an inlet to a penstock 44, and a piping system for carrying condensate 62, effluent 5, steam 60 and cooked water 64 as described below.

The effluent 5 is piped through a plurality of pumps 15 to site 30 where it is routed in one of several directions. The effluent 5 may be injected directly into the geothermal strata 40, located deep below the surface of the site 30, or into the heat exchanger system 52, for use as a cooling medium. After use as a cooling medium in heat exchanger system 52, the effluent 5 is injected into the geothermal strata 40. From the geothermal strata 40, geothermal steam 60 is extracted through its own distribution to the steam turbine-generator 50, where it is expanded and condensed to produce electricity. From the steam turbine-generator 50, the condensate 62 is piped either to a holding pond 46, or to the geothermal strata 40 where it is re-injected. Any fraction of the condensate may be re-injected into the geothermal strata 40, or directed to the holding pond 46. The holding pond 46 stores condensate 62, for further use. Cooked water 64, also extracted from the geothermal strata 40, is also piped to the holding pond 46. The condensate 62 and cooked water 64 provide sterilized water that is void of all live bacteria, virus, and/or vegetation.

The condensate 62 and/or cooked water 64 is introduced into the holding pond 46 sufficiently below its surface to avoid any contamination of the air due to vapors effected by contact with the geothermal strata 40. The holding pond 46 provides the needed volume and pressure to be useful when directed down penstock 44 to the inlet of the hydroelectric turbine-generator 70, where the potential energy is extracted in the form of electricity. After flowing through the hydroelectric turbine-generator 70, the condensate 62 and cooked water 64 are processed in water treatment system 80, consisting of filtration and chemical treatment to remove sulfur, arsenic, iron and dissolved solids. No organic contamination will exist after injection and recapture as steam or cooked water.

In another embodiment of the present invention, treatment of the fractions of cooked water 64 and/or condensate 62 to be directed to the holding pond 46 may first be treated to produce potable water, thereby eliminating potential problems stemming from a contaminated holding pond. The potable water may then either be held and distributed for public consumption or directed down penstock 44 to extract the potential energy in the hydroelectric turbine-generator 70.

For example, condensate 62 and/or cooked water 64 can be piped to a distillation plant 90. Also, in the event of interruption of re-injection of the condensate 62 from the heat exchanger system 52, the flow can be maintained via a bypass 53 of the re-injection well to flow condensate to the distillation plant 90. The distillation plant 90 is preferably located on the steam-field side of the site 30 and is provided with water that is already near the flash point temperature. The temperature of the condensate 62 and cooked water 64 is such that only an incremental amount of heat, if any, is needed to convert liquid phase water to vapor, that is, any liquid can be economically heated to a vaporous state. The water vapor can then be condensed as distilled water. The distilled water is then collected or directed down the penstock 44, to the inlet of the hydroelectric turbine-generator 70, and, thence, to the water treatment system 80, for removal of any contaminants dissolved or suspended in the distilled water en route to the water treatment system. Also, in the event that the return line to the penstock 44 ceases to vacate, causing a stoppage of the flow from the distillation plant 90, the plant flow may be temporarily diverted to the holding pond 46.

Figure 2:
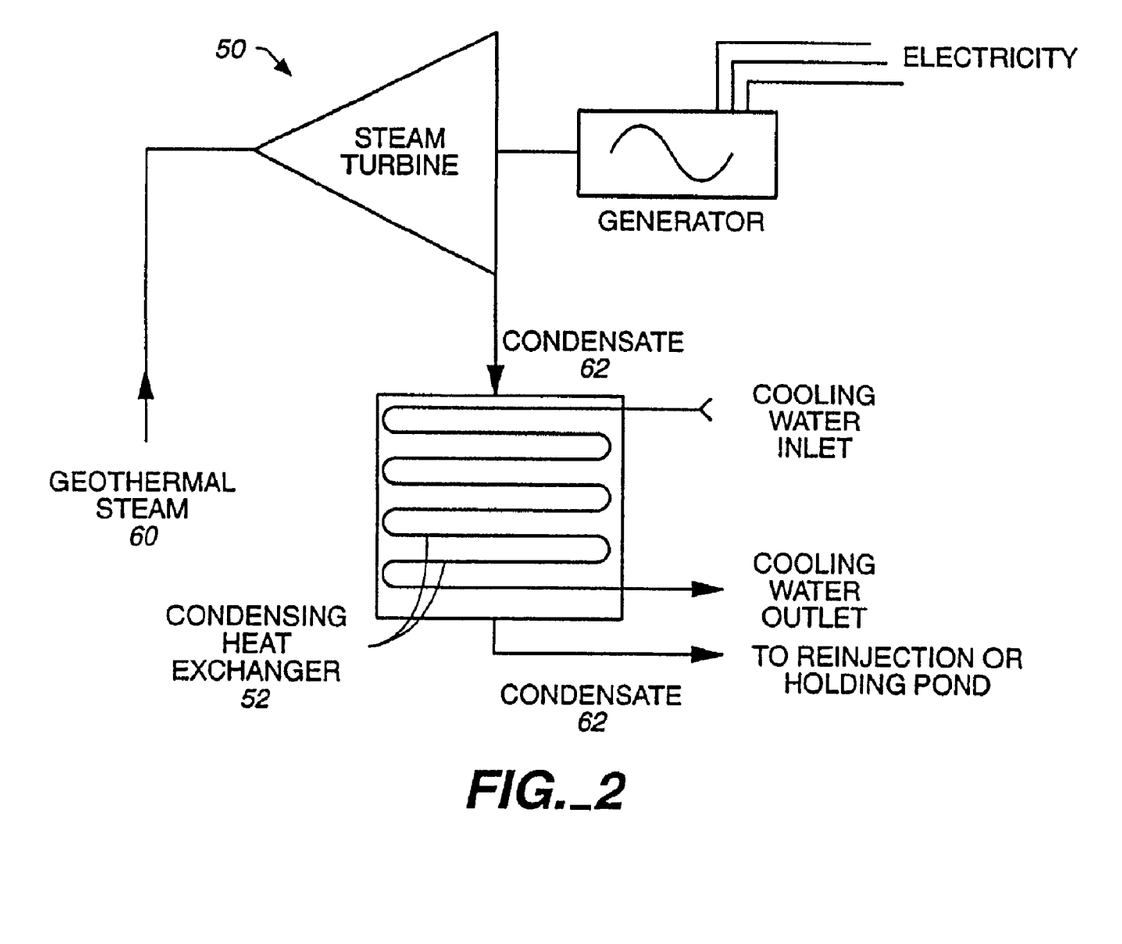
FIG. 2 is a schematic diagram of a steam turbine-generator and its connected cooling water and condenser system.

Steam turbine-generators employ cooling water for a variety of reasons, but a chief application is in the condensing heat exchanger system 52, which is flexibly connected to the exhaust of the steam turbine-generator 50, as shown in FIG. 2, and which usually receives its cooling water from a cooling tower. It is possible that traditional cooling towers may be reduced in size or even eliminated by using the large volume of available effluent for cooling. The condensing heat exchanger 52 creates a relative vacuum in the low-pressure stages of the steam turbine-generator 50, helping the expansion of the steam 60 through the system.

Figure 3:
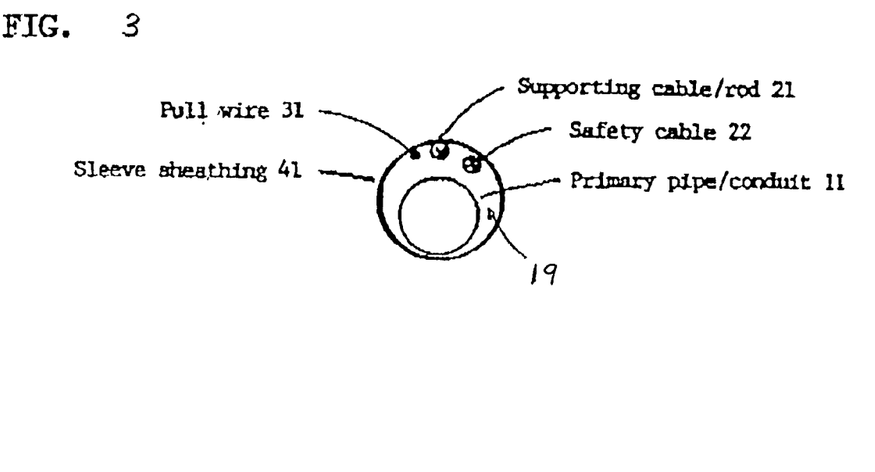
FIG. 3 is a cross-section of a primary pipe/conduit 11 with supporting sleeve sheathing 41 and supporting cable/rod 21, safety cable 22, and pull wire 31, constituting the ensemble when utilizing sleeve sheathing 41.
Figure 4:
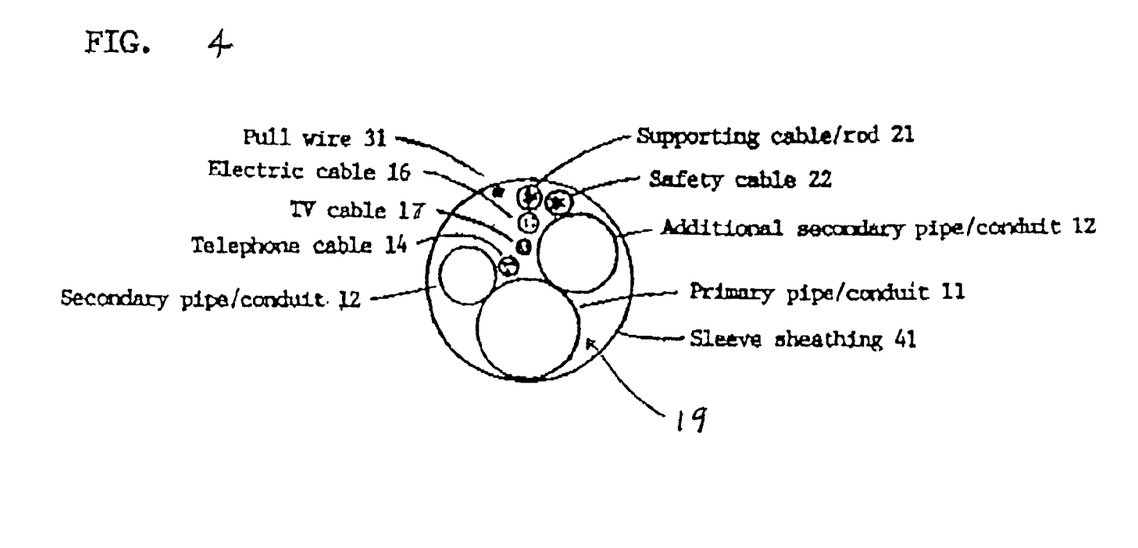
FIG. 4 is a cross-section of a multiple pipe/conduit/cable (MPCC) 19 assembly, with sleeve sheathing 41, supporting cable/rod 21, safety cable 22, and pull wire 31.

One embodiment of the present invention enables pipe/cable/conduit (PCC) to be laid within inundated or across unstable areas without the need of prior excavation, trenching or other ground preparation and without bedding, while still providing stability and protection to the PCC against damage. The technology of this invention permits the use of an unlimited selection of kinds and types of primary and secondary pipes/conduits 11 and 12 in the form of rigid, supple, sectioned or spooled with coupled, screwed or mechanically jointed ends along with cable conduits 14, 16 and 17 and collectively referred to hereinafter as multiple pipe/cable/conduit (MPCC) 19 for the transport of fluids, particulate matter, electric current and/or communication signals, and these types and kinds may be interchangeable as the particular need may arise, and none of which would be subject to damage subsequent to their being laid due to their being secured by an engineered supporting cable or rod 21 and protected by a sleeved sheathing 41. The assembly will now be described in more detail.

The MPCC 19 is to be sleeved by a larger diametered housing as a sheathing 41, and one or more rods and/or cables 21 installed between the MPCC 19 and the sheathing 41 for semi- or intervaled suspension and/or restraint of the ensemble from flexing action, and is also accompanied by a pull wire 31 strung between the MPCC and the sheathing to provide a mechanism for pulling the supporting cable or rod 21 through, or for its replacement, subsequent to the time of assembly and installation/placement.

The assembly also comprises couplings/ties. The couplings or ties at the ends of the rod and/or cables 21 and 22 are preferably wrapped to prevent them from becoming snagged on the ends of the lengths of the MPCC 19 whenever any of the rod and/or cables 21 and 22 would be withdrawn for repair or replacement.

Protection of the MPCC 19 is provided by the sheathing 41, and its specifications would vary to adequately suit the anticipated conditions to which the MPCC would become subjected.

The MPCC 19 is to be protected in its entirety from damage by being encased by a sleeve sheathing 41 and it being the intent that the sheathing 41 shield the MPCC 19 from the river current, any impacts from traveling debris carried by any river current or from any blows caused by man, or the like. The sleeve sheathing 41 can be constructed of whatever durable material to suit and which is available under each installation circumstance. The sleeve sheathing 41 may be sealed at the ends or left open to suit the nature of the MPCC 19 and whatever is to be transported. Preferably, the material should be capable of being readily uncoupled if its sections are to be jointed. The inside diameter or opening should be such to be permitted adequate clearance from the MPCC 19 to permit the installation of the rod and/or cables 21 and 22 and the pull wire 31 and subsequently to be readily withdrawn when required.

Tension rod or cables 21 and 22 are to be installed to provide support for the MPCC 19 and restraint from tensile separation or compression shifting and/or flexing stresses of the MPCC as a result of fluctuations in the river current or from ground movements. The cables 21 and 22 can be standard metal wire cable or any durable waterproof multiple-strand, non-metallic material capable of sustaining high, continuous tensile loading without elongation and/or failure. The diameter of the cable or rod 21 should be that which would be required to include a safety factor, as normally would be determined by the MPCC 19 designer/engineer, and the rod and/or cables 21 and 22 would be attached to anchors in, ashore and/or submerged within the body or area being traversed. The clearance between the MPCC 19 and the sleeve sheathing 41 may not be void of water; therefore, the ends of the rod and/or cables 21 and 22 should be allowed to protrude through/from the sheathing 41 to be fastened to the anchors.

The rod and/or cables 21 and 22 can be tensioned to suit, by whatever mechanical or hydraulic means from the various anchor sites/points along the MPCC 19 alignment.

If more than one cable or rod 21 is utilized, all could be at reduced tension to that of the primary cable or rod 21, to act only as a safety. For example, the cable 22 could be provided in the event of damage to the primary cable or rod 21.

The ends of the rod and/or cables 21 and 22 located within the sleeve sheathing 41 should be coupled by connectors and should be wrapped to provide their unobstructed passage over/past any end joint of the MPCC 19.

The pull wire 31 is preferably a metallic or multiple-strand, non-metallic cord with high tensile strength installed along side the primary support rod or cable 21 at the time of assembly to be used to pull through any replacement supporting rod or cable 21 in the event of damage to the primary rod or cable 21. The pull wire 31 need not be left under tension.

Figure 5:
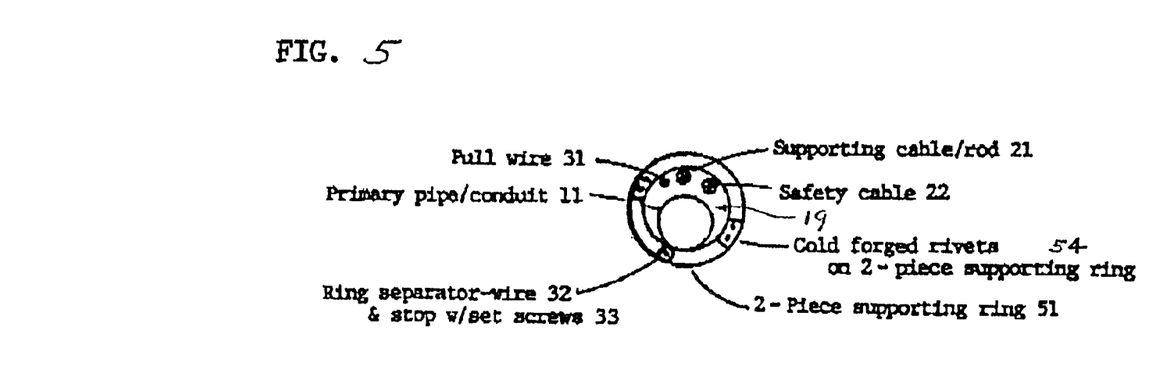
FIG. 5 is a cross-section of a primary pipe/conduit 11 with two-piece supporting rings 51 with their cold forged rivets 54, a ring separator wire 32 and supporting ring stops with set screws 33, along with pull wire 31, comprising the ensemble utilizing support rings 51 and no sleeve sheathing 41.

In an alternative embodiment, when protective sheathing 41 for the MPCC 19 is not being utilized, regularly spaced supporting rings 51 around the MPCC 19, as shown in FIG. 5, are installed for the rod and/or cables 21 and 22 to support the MPCC 19. The rings or bands 51 may be of metal or non-metallic material and can be one-piece fabrication; however, those of two or more pieces or open ended may be joined by cold forged rivets 54 or otherwise united into an assembly without the application of heat, as shown in FIG. 5, and pre-drilled to accommodate being threaded by a ring separator wire 32.

Figure 6:
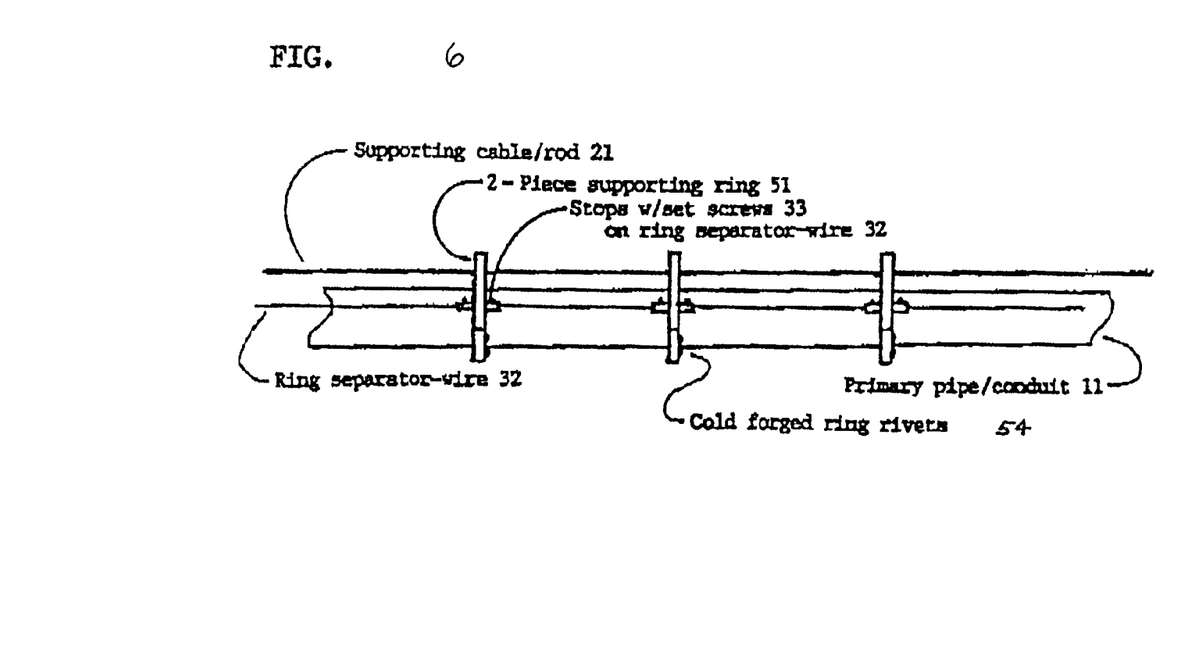
FIG. 6 is a profile of FIG. 5, showing a primary pipe/conduit 11, with two-piece supporting rings 51 with cold forged rivets 54, a ring separator wire 32 with stops for each face of the supporting rings with set screws 33. (Not illustrated here is the supporting cable/rod 21, safety cable 22 and pull wire 31 of FIG. 5.)

The supporting rings/bands 51 should be allowed to slide longitudinally along the MPCC 19, but then become stopped at regular intervals by supporting ring/band separator stops 33 on the supporting ring/band separator wire 32 threaded through pre-drilled holes through the rings 51, utilizing crimped clips or sleeves with set screws 33 to the wire after the stops have been placed against each of the faces of the separating rings/bands 51, as illustrated in FIG. 6.

The ends of the supporting rod(s) or cable(s) 21 and 22 are to be fastened to anchors installed at regular intervals, or wherever the physical circumstances require to accommodate the MPCC 19 alignment. The anchors can be pre-cast or constructed in place using poured concrete, concrete block, stone or brick masonry, be screwed or driven into the ground and/or using marine dolphins or piling to secure the MPCC 19 ensemble.

The system also provides bridging between anchors. The MPCC 19 can be installed utilizing marine dolphins, floats, pontoons, and/or buoys as anchors, where the bottom of the body or area being traversed is unknown, not readily accessible, and/or is too unstable to permit any bedded type of anchor construction.

The system provides accessibility and the ability to raise the MPCC 19. The anchor ends of the MPCC 19 can be made readily accessible at any of the anchor sites/points and can then be made readily capable of being uncoupled and raised for inspection, change, and/or repair, and then re-laid to rest without difficulty.

It is preferable that the ensemble be laid longitudinally versus laterally to any river current or flow to minimize externally produced tension upon the MPCC 19 caused by the current, to avoid cavitation under the sleeve sheathing 41, and to avoid flank impacts by current transported objects.

Additional pipeline shielding is preferably provided to address the need to shield the MPCC 19 when it lies laterally to the current of the river or stream, as would normally be found at the points of ingress to, or egress from, the stream and in areas which would be significantly away from eddy areas along the shorelines. The additional shielding is provided by deflectors.

Figure 7A:
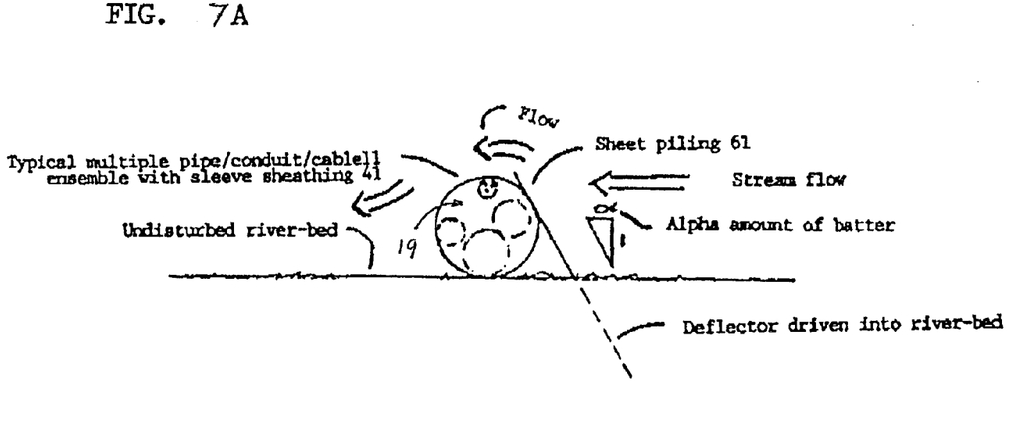
FIG. 7A is a cross-section of a typical pipe/conduit/cable 11 ensemble with sleeve sheathing 41 laid laterally to a stream flow and sheltered from the lateral stream flow by steel sheet piling 61 driven against it on its upstream side and driven into the undisturbed riverbed.
Figure 7B:
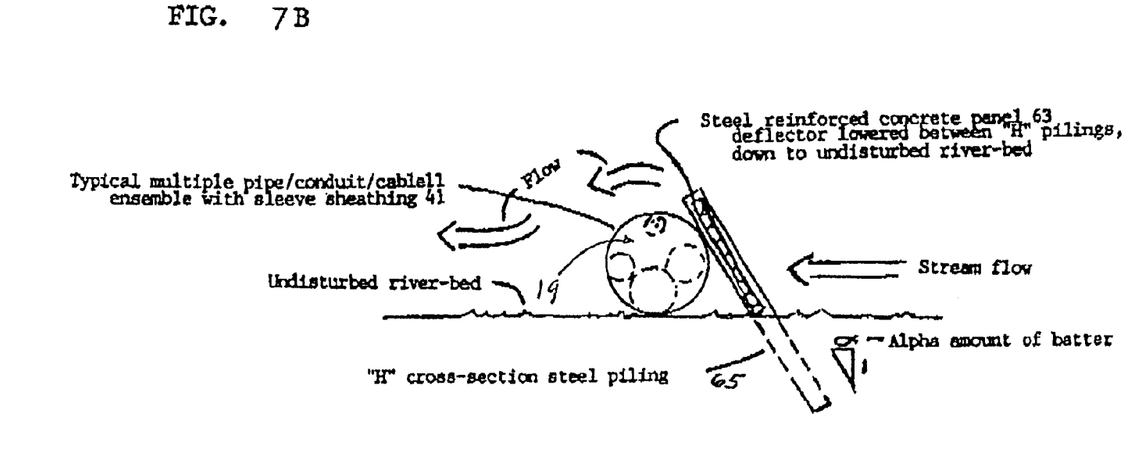
FIG. 7B is a cross-section of a typical pipe/conduit/cable 11 ensemble with sleeve sheathing 41 (as shown in FIG. 7A) laid laterally to the stream flow and sheltered from the lateral stream flow by reinforced concrete or other rigid paneling 63 held in place by "H" cross-section steel piling 65 driven into the undisturbed riverbed.

As shown in FIGS. 7A and 7B, the shielding is meant to protect the full profile of the MPCC 19 by installing deflectors, constructed of sheet piling 61 driven into the undisturbed riverbed, or of a pre-constructed fabrication of panels 63, such as of steel reinforced concrete retained in place by "H" cross-section steel piling 65 driven into the riverbed without excavation or other disturbance of the riverbed, installed along the upstream side of the MPCC 19, and battered by a factor of alpha from the plumb in an amount to be computed and made directly proportional to the magnitude of the maximum anticipated current velocity of the river or stream during flood and with the top edge of the panel being high enough above the top of the MPCC 19 to cause a vertical deflection of the flow up-and-over the top of the MPCC 19, and thereby preventing cavitation under the MPCC 19 and/or deflector 61 or 63 in addition to providing the MPCC 19 complete protection from debris and the continuous lateral hydraulic pressure loading of the stream flow, which could adversely deflect the MPCC 19, as well as exert potentially excessive tensile, or compressive, stress to the MPCC 19 and to its supporting rod or cable 21.

Such preventative measures should be taken wherever alignments of the MPCC 19 lateral to the current flow would not be sheltered by eddy currents normally found along shorelines. The deflectors 61 or 63 aid the preservation of the MPCC 19 within the hostile environment normally expected for the implementation of the invention. The deflectors 61 or 63 render that environment compatible to the utility and long lasting potential to its installation.

Laying/placement of the MPCC 19 is adaptable. The technology of the present invention permits the ensemble of the MPCC 19 with sheathing 41, rod and/or cables 21 and 22 and pull wire 31 to be laid to rest on the undisturbed bottom of any body of water, across any area of quick soil, swamp, bog, or to be suspended between any two or more points, and/or laid interchangeably above and below the aqueous surface of any of these traversed areas without ground or bedding preparation being required. The MPCC 19 support method can be readily alternated from rod and/or cable support with sleeve shielding to rod and/or cable with rings/bands support, then readily reverted thereafter, particularly when in proximity to an anchor, without difficulty or limitations. The deflectors 61 or 63 are provided to protect the MPCC 19 installation when needed.

In another embodiment, the present invention provides for the conveyance of water such as wastewater or other pumpable fluids, as well as utilities such as electricity, through a mountainous terrain, or other sites not readily accessible for pipeline construction, by way of a tunnel housing any number of utility lines/pipes/conduits and referred to as a utili-tunnel.

The purpose of the utili-tunnel is to make it possible to lay conduits traversing areas not readily compatible to such construction, particularly in seismically active locations. Preferably, a "pipe breach flow-check" incorporated into the structure of the utili-tunnel provides protection against damage resulting from flooding in the event of a pipe breach.

Figure 9:
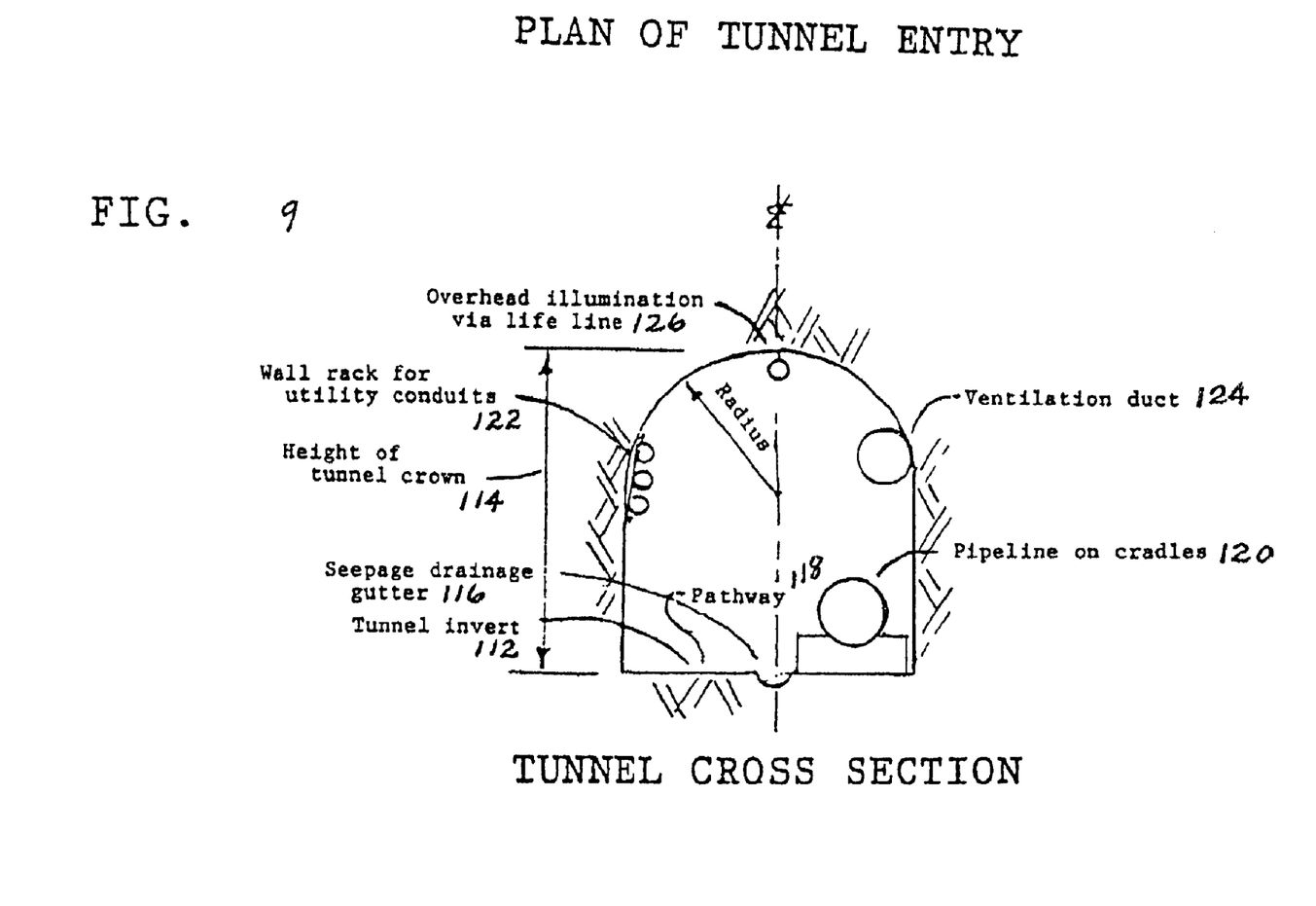
FIG. 9 shows a cross-section of the utili-tunnel.
Figure 10:
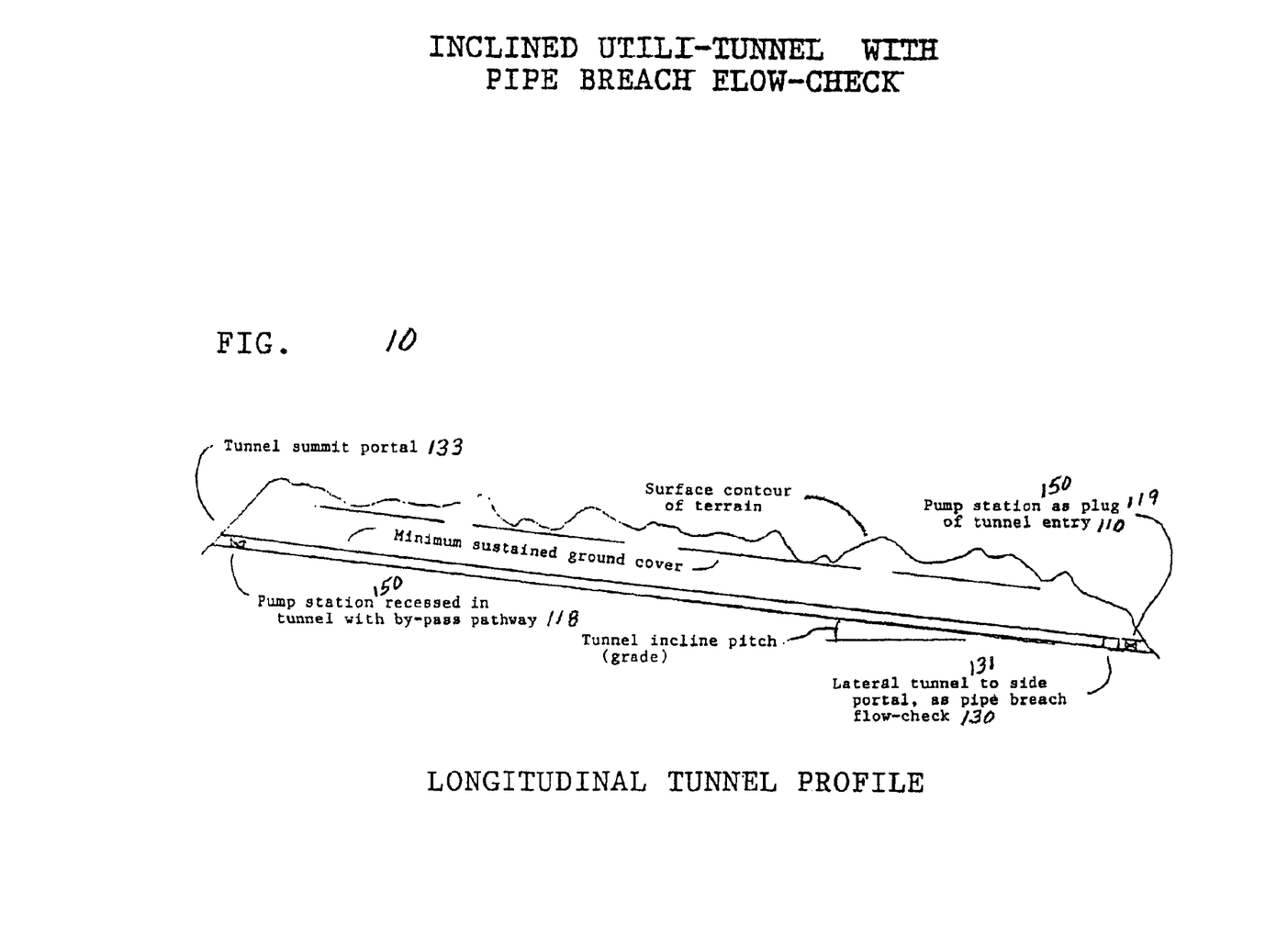
FIG. 10 shows a longitudinal utili-tunnel profile.
Figure 11:
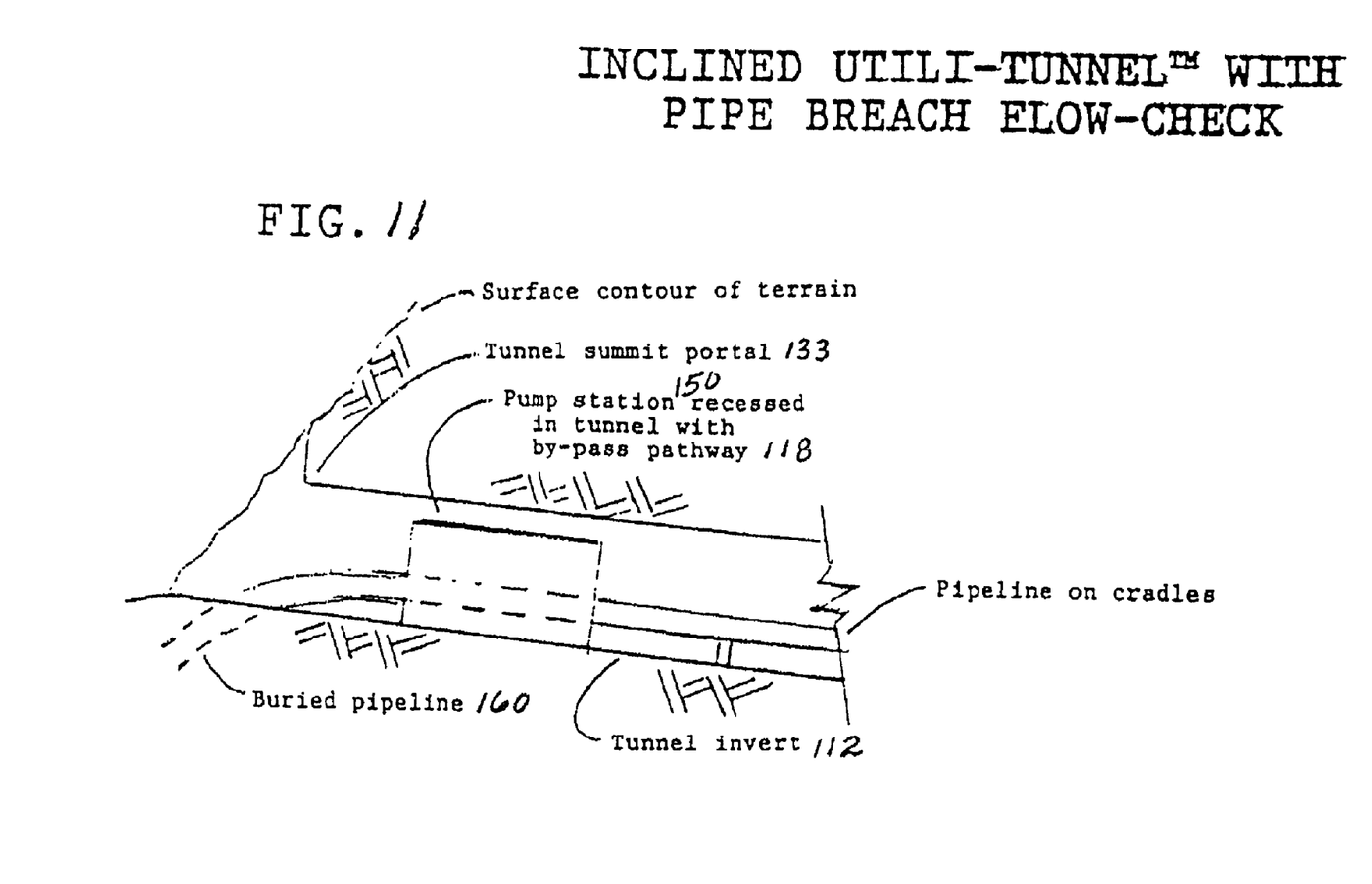
FIG. 11 shows a utili-tunnel summit profile.
Figure 12:
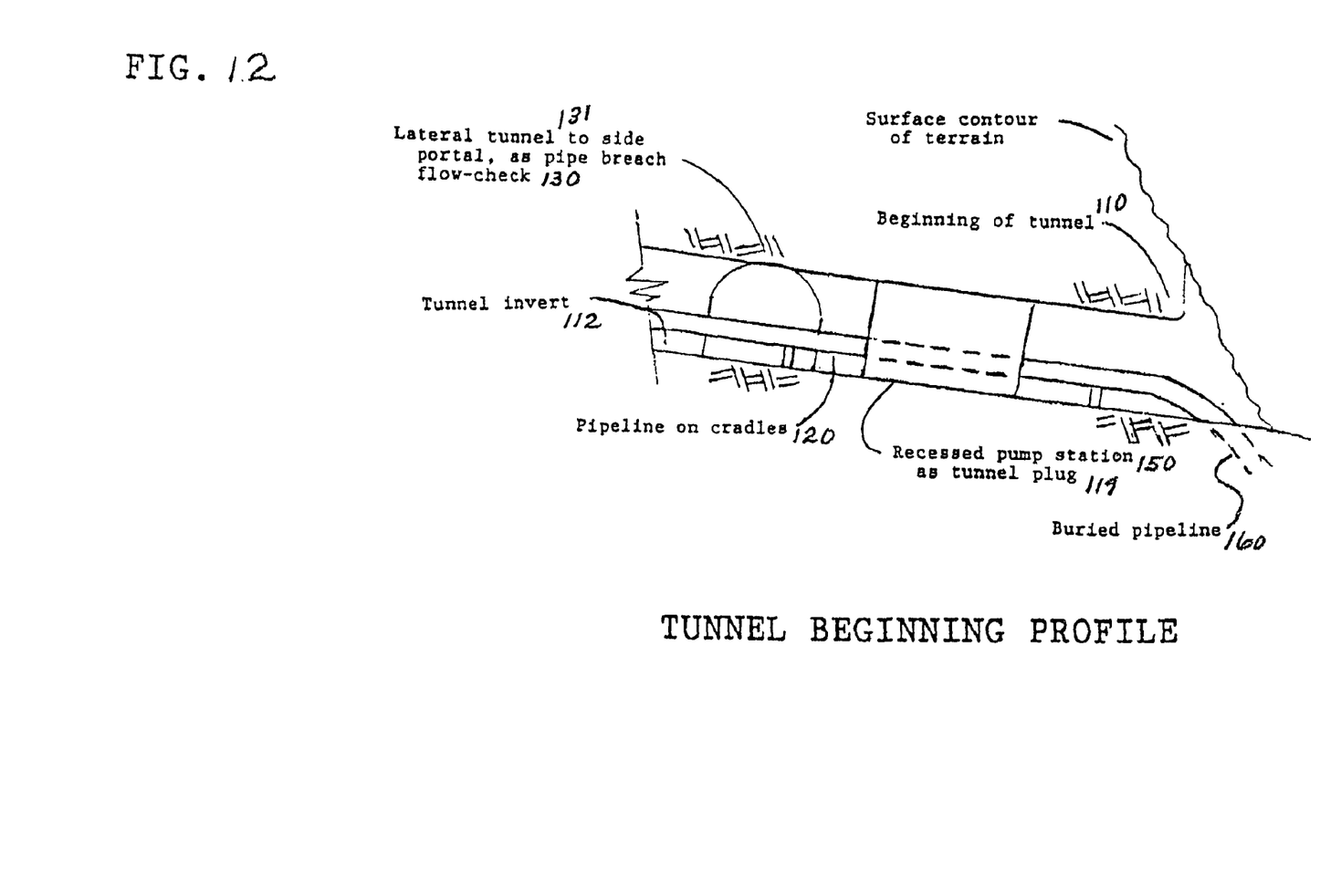
FIG. 12 shows a utili-tunnel beginning profile.

As shown in FIG. 9, the utili-tunnel has a crown (ceiling) 114, for example, twelve feet high, and an eight-foot width, for optimum utility. Construction would initiate typically by excavating the crown 114, followed by excavating (lowering) the invert (floor) 112 to provide the head clearance desired.

Depending upon the type of soil being excavated, a concrete or grout liner may, or may not, be needed. If provided, the liner is preferably put in place as the tunnel excavation advances.

Figure 8:
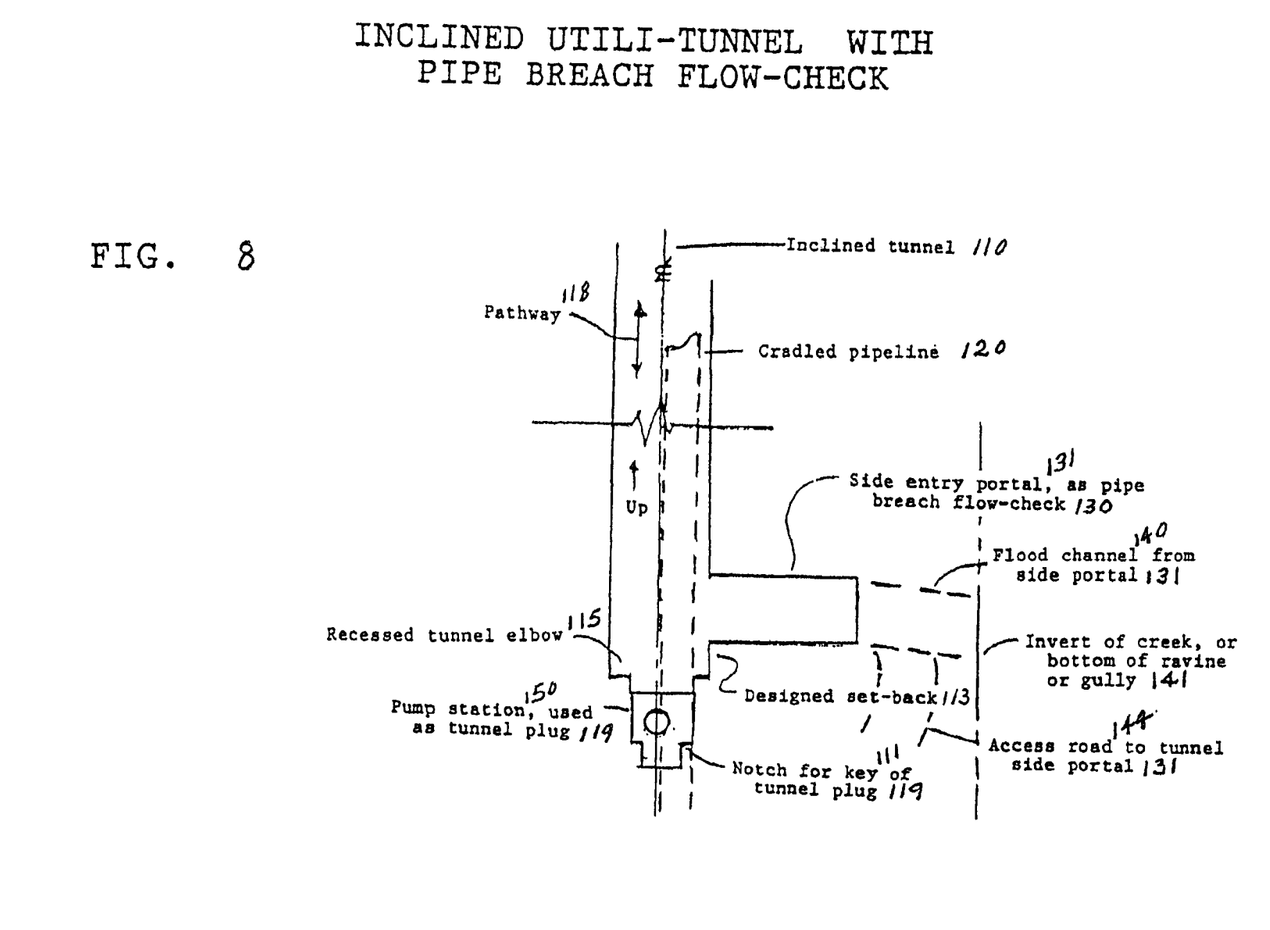
FIG. 8 is a plan view of a utili-tunnel entry.

Preferably, a pipe breach flow-check 130 is provided, as shown in FIG. 8. If the utili-tunnel is inclined and a pipe breach occurs, the flow out of the tunnel portal (entry) 110 could become catastrophic to the adjoining landscape. This condition can be averted by designing and constructing what is termed a "pipe breach flow-check" 130 in the utili-tunnel. The pipe breach flow-check 130 comprises a lateral tunnel 131 commencing near the portal having the lowest tunnel elevation.

The lateral 131 would be of the same configuration as the main tunnel and would daylight (exit) to the surface terrain. The main tunnel 110 between the portal and this lateral would then be plugged 119, as shown in FIG. 8.

The utility of this uniquely configured pipe breach flow-check 130 is that the hydraulic hammer associated with the burst and downward flow of water following a breach travelling down the utili-tunnel to exit the tunnel would slam against the plug 119. Subsequent to that impact, the water would then flow through the lateral 131, without causing impact damage. This feature is of particular importance when constructed in areas subject to strong seismic activity.

One or more pipes can be routed through the utili-tunnel. As shown in FIG. 9, the pipe(s) should be positioned close to the wall of the tunnel and supported by cradles 120, spaced evenly at intervals so as to minimize sag in the pipe. Strapping the pipe to the cradles is optional.

Conduits and electric or communication cables can also be fastened/mounted to racks 122 fastened to the upper walls of the utili-tunnel, as shown in FIG. 9. Lighting can also be provided. Tunnel illumination can be achieved by mounting a lifeline 126 of caged lights to the center of the crown of the utili-tunnel.

Additionally, ventilation can be provided for the interior of the utili-tunnel. Ventilation within the utili-tunnel can be achieved by wall and/or crown mounting of a duct 124, commencing from the portals and/or from vertical shafts to the surface. Fans can then be positioned within the ducts to control air movement. In anticipation of seepage into the utili-tunnel, a paved gutter 116 can additionally be constructed in the center of the tunnel invert (floor) 112.

One or more pump stations are provided in conjunction with the utili-tunnel. In one embodiment, pump stations 150 can be constructed inside the tunnel. For example, most strategically would be to place one pump at the portal containing the pipe breach flow-check lateral 131, as shown in FIG. 8.

Other pumps can be installed either straddling or alongside of the pipe by excavating alcoves to suit. Electrical power to the pumps can be racked and/or dropped via shafts from the surface.

Construction of the utili-tunnel has various advantages. Utili-tunnel construction can be very practical and economical when traversing mountainous terrains and/or when extreme climactic conditions and the risk of vandalism exists. Various other and more specific advantages are as follows: (a) inspection of the pipes, conduits and cables can be conducted at all hours, without concern for adverse weather conditions; (b) no excavations are needed to expose any of the utility lines in order to conduct inspections or repairs; (c) clearance 118 along the pipe(s) 120 can be such to permit the use of a golf cart to travel the entire length of the utili-tunnel; (d) repairs can be conducted at all hours without hindrance; (e) the utility lines would not encroach on private lands and/or facilities on the surface; (f) public access could be avoided; (g) the interior of the utili-tunnel would not be subject to freezing and/or snow, and (h) when constructed with a pipe breach flow-check, the utili-tunnel can be constructed and utilized in areas of potentially high or intense seismic activity.

The technology associated with the MPCC 19 and/or utili-tunnel of this invention consists of mechanical assemblies constructed from common existing and readily available materials, and requiring no sophisticated workmanship to assemble or skill to lay or install, other than what is common knowledge to any experienced pipeline, pile driving, excavating and concrete workers. The technology provides the means of selecting the shortest possible pipeline route/alignment for the laying of the MPCC 19 and/or utili-tunnel and which could not otherwise be accessible, available or traversable, while making the pipeline less susceptible to damage after having been laid and potentially at a lower construction and/or maintenance cost.

While the invention has been described in connection with what is presently considered the most practical and preferred embodiments, it is to be understood that the invention is not limited to the disclosed embodiments but, on the contrary, is intended to cover various modifications and equivalent arrangements included within the scope of the appended claims.

What is claimed is:

1. A system for the laying of pipe or other conduit for the transport of fluids, particulate matter, electrical current and/or communication signals between a first site and a second site, while providing a potentially more direct or convenient alignment or route between the first and second sites, comprising:

at least one pipe or conduit between the first site and the second site;

means for holding the at least one pipe or conduit, comprising:

a plurality of supporting rings adapted to slide longitudinally along the at least one pipe or conduit;
at least one ring separator wire;
a plurality of stops for each supporting ring; and
means for securing the stops to the ring separator wire;
a supporting cable or rod disposed within the holding means to support the holding means; and
a pull wire or cord disposed within the holding means.

2. The system according to claim 1 wherein the means for holding the at least one pipe or conduit further comprises sleeve sheathing to provide protection against external damage from impacts, stresses, ground movements, bedding cavitations or erosions.

3. The system according to claim 1 wherein each supporting ring comprises two or more sections secured together by cold forged rivets and pre-drilled to accommodate being threaded together by the ring separator wire.

4. The system according to claim 1 wherein the means for securing the stops to the at least one ring separator wire comprises crimped clips or sleeves secured with set screws to the separator wire after the stops have been placed against each of the supporting rings.

5. The system according to claim 1, further comprising a safety cable for supporting the holding means in the event that the supporting cable or rod fails.

6. The system according to claim 1 wherein the pipe transports wastewater effluent to revitalize a depleted geothermal field at the second site.

7. The system according to claim 6 wherein a sewage treatment plant located at the first site provides the effluent for use in a geothermal field located at the second site.

8. The system according to claim 1 wherein at least a portion of the system is routed along an undisturbed riverbed, on the bottom of any body of water, across a swamp, a bog, areas of quick soil or across any other area of unstable material and/or spanning potholes, cavities or trenches while fully or partially suspended, while requiring no bedding preparation.

9. The system according to claim 1 wherein at least a portion of the system is routed along an undisturbed riverbed, further comprising steel sheet piling disposed on the up-stream side of the system and driven into the riverbed.

10. The system according to claim 1 wherein at least a portion of the system is routed along an undisturbed riverbed, further comprising reinforced concrete or other rigid paneling disposed on the up-stream side of the system and held in place by "H" cross-section steel piling driven into the riverbed.

11. The system according to claim 1 wherein the system is installed utilizing marine dolphins, floats, pontoons and/or buoys as anchors, where the bottom of the body or area being traversed is unknown, not readily accessible and/or is too unstable to permit any bedded type of anchor construction.

* * * * *